United States Patent
Kopf (10) Patent No.: US 6,888,855 B1
(45) Date of Patent: May 3, 2005

(54) OPTICAL SYSTEM FOR LASERS

(76) Inventor: Daniel Kopf, Walgaustrasse 9, A-6832 Rothis (AT)

( * ) Notice: Subject to any disclaimer, the term of this patent is extended or adjusted under 35 U.S.C. 154(b) by 330 days.

(21) Appl. No.: 09/980,458

(22) PCT Filed: Jun. 7, 2000

(86) PCT No.: PCT/EP00/05203
§ 371 (c)(1),
(2), (4) Date: Feb. 25, 2002

(87) PCT Pub. No.: WO00/77890
PCT Pub. Date: Dec. 21, 2000

Related U.S. Application Data (60) Provisional application No. 60/138,895, filed on Jun. 11, 1999.

(51) Int. Cl.[7] ................................. H01S 3/10
(52) U.S. Cl. ........................... 372/9; 372/21
(58) Field of Search .............. 372/21, 22, 92, 372/101, 108, 18, 9

(56) References Cited

U.S. PATENT DOCUMENTS

| | | | | |
|---|---|---|---|---|
| 5,046,070 A | * | 9/1991 | Negus | 372/33 |
| 5,097,471 A | * | 3/1992 | Negus et al. | 372/18 |
| 5,163,059 A | * | 11/1992 | Negus et al. | 372/18 |
| 5,648,866 A | * | 7/1997 | Trebino et al. | 359/326 |
| 5,757,842 A | * | 5/1998 | LaPlante et al. | 372/98 |
| 5,799,025 A | * | 8/1998 | Lai et al. | 372/18 |
| 5,936,785 A | * | 8/1999 | Do et al. | 359/822 |
| 6,393,035 B1 | * | 5/2002 | Weingarten et al. | 372/18 |

* cited by examiner

Primary Examiner—Minsun Oh Harvey
Assistant Examiner—James Menefee
(74) Attorney, Agent, or Firm—Oliff & Berridge, PLC

(57) ABSTRACT

An optical system for a laser comprises at least means for imaging a laser beam onto a first optical material (1, 1b). These imaging means comprise at least one optical image system (2) for focusing said laser beam onto the first optical material (1, 1b) and at least one optical means for changing the angle of the propagation axis of the laser beam, whereby the optical imaging system is positioned between the optical means and the first optical material, and may be described by formula (I) whereby D is substantially zero $$\begin{pmatrix} AB \\ CD \end{pmatrix} - \text{matrix.} \qquad (I)$$

13 Claims, 7 Drawing Sheets

OPTICAL SYSTEM FOR LASERS

FIELD OF THE INVENTION

This invention relates to the field of lasers and optics where the laser beam passes through or is reflected from the surface of an optical material which has limited durability under light exposure.

Furthermore, this invention relates to holders for optical components.

BACKGROUND OF THE INVENTION

Solid state optical materials, such as for example the solid state laser materials or non-linear optical materials, are usually interesting for several reasons. They can, for instance, come in small sizes, can withstand high intensities on a spot, can be manufactured in high quantities, and are easy to handle because they are solid (in comparison to, for example, liquid dyes or gases). However, in some cases these materials do not live for extended times when being exposed to a certain light intensity. This can occur, for example, when a nonlinear crystal is used for frequency-converting the laser light, whereby the laser beam is usually focused onto a small spot or has high peak powers. Similarly, semiconductors may show long-term degradation effects which can limit the time of use of semiconductor materials when exposed to a certain intensity on a spot. Any kind of other optical elements may suffer from similar effects. The goal of this invention is to use up all or a substantial fraction of the available material and not only the material at a certain spot in the material. Instead of moving the material transversely with regard to the incident light beam and thereby moving the light spot to another position inside the material, a very simple technique to move the spot on the material is described herein; this technique allows the use of different spots on the material.

As for the holder for optical components, the goal is to make simple, easy-to-manufacture, and easy-to-use holders for optical components. Of special interest are optical holders for laser mirrors which are cost-effective, use a minimum of adjusters while still allowing for a certain degree of adjustability.

STATE OF THE ART

Nonlinear optics: Many nonlinear optical crystals that are used for frequency conversion have limited usability when being exposed to light of a certain intensity. For example, the well-known crystal potassium titanyl phosphate (KTiOPO4, KTP) has been reported to suffer from long-term degradation effects, all of which are still under investigation and one of which was called "grey tracking". On the market, many Neodymium-based laser sources that are converted into the green by second harmonic generation use KTP as the doubling crystal, both as intra cavity or as extra cavity, and have shown limited long-term operation due to the KTP crystal degradation properties under light exposure. Long-term degradation is often also reported for nonlinear crystals which are used to convert (laser) light into the ultra violet. For example, beta-barium borate, known as BBO, is well known for this application but has shown long-term degradation effects over a time duration in the order of 100 or 1000 hours. In some cases, the problem was solved by transversely moving the crystal with respect to the incident beam, which results in a different spot being "used up". The disadvantage, however, is that usually the crystal has to be moved while keeping its angle orientation constant at very high precision to ensure optimum frequency conversion efficiency. This must often be done by using relatively expensive translation stages.

Semiconductor materials and surfaces: Semiconductors usually have lower optical damage threshold than other solid state optical materials such as laser crystals or optical glass. Also well known is the limited life time of laser diodes which is due to both bulk material and surface degradation, again showing that the issue of long-term degradation becomes apparent in semiconductors. Semiconductor materials are also used for ultra short pulse generation from lasers, particularly solid state lasers. Such devices are for example the SESAMs (semiconductor saturable absorber mirrors), which were demonstrated to generate pulses at various wavelengths in a variety of laser systems. In some publications, it is pointed out that their life time is limited and optical degradation occurs on the spot being exposed to the laser beam. Again, transversely moving in SESAM to another position such that a "fresh", unused spot is being used would enhance the laser life time by a factor corresponding to as many times as the SESAM can be moved. However, translation stages that are used for this purpose are costly and of rather big size or have to be replaced quite frequently.

Linear and other optical materials: Aside from the materials listed above, similar degradation effects are also apparent in any kind of optical materials, depending on the type of material, the incident intensity and/or the peak intensity, the temperature of the material, the incident light wavelength, etc. For example, ultra violet wavelengths tend to damage many optical materials over the time if reaching a certain intensity. Also in these cases, the solution that has so far been presented has usually been the replacement of the material after usage or the transverse movement.

Mirror holders and optical holders: The mirror holders used most commonly still need, for each adjustable axis, one adjustment screw. In addition, one set screw is necessary to hold the adjusted mirror in place. Furthermore, such standard mirror holders have to be fixed onto the optical platform or onto a post with a fixing screw. Mirror holders of this type of can be found in the repertoire of most opto-mechanical components vendors. However, the number of screws required to give the freedom to make all the adjustments necessary, results in increased costs, more complicated assembly procedures, and higher risks of failure during long-term operation. Therefore, a mirror holder would be required using a minimum of screws and adjusters allowing an adjustment within a certain range before all screws are locked in place.

SUMMARY OF THE INVENTION

The invention relates to the field of lasers and optics where the laser beam passes through or is reflected from the surface of a material which has limited durability under light exposure. To overcome the problems described above the invention describes a simple technique by way of which the spot is moved across the material, thereby enhancing the lifetime of the laser or optical system since more than one sole spot of the same materials is used. This technique may be used in combination with material being used inside a laser cavity as well as outside a laser cavity, or in general in any application where high intensity light is exposed to a part of an optical material.

Furthermore, this invention relates to optical holders for optical components. An optical holder is described, which is both simple and stable. For such an optical holder only a minimum of screws is used: for example one set screw and one fixing screw but no adjustment screw. Nevertheless, the holder allows adjusting both the vertical and the horizontal angle of the optical component within a certain range. The holder relies on a double-V-groove supporting technique, which holds the optical component in place in a predetermined way, unaffected from machining tolerances.

BRIEF DESCRIPTION OF THE DRAWINGS

FIGS. 4a, 4b and 4c show the principle of an optical holder according to the invention, whereby FIG. 4d is an alternative embodiment according to FIG. 4a;

DESCRIPTION OF THE INVENTION

Figure 1:
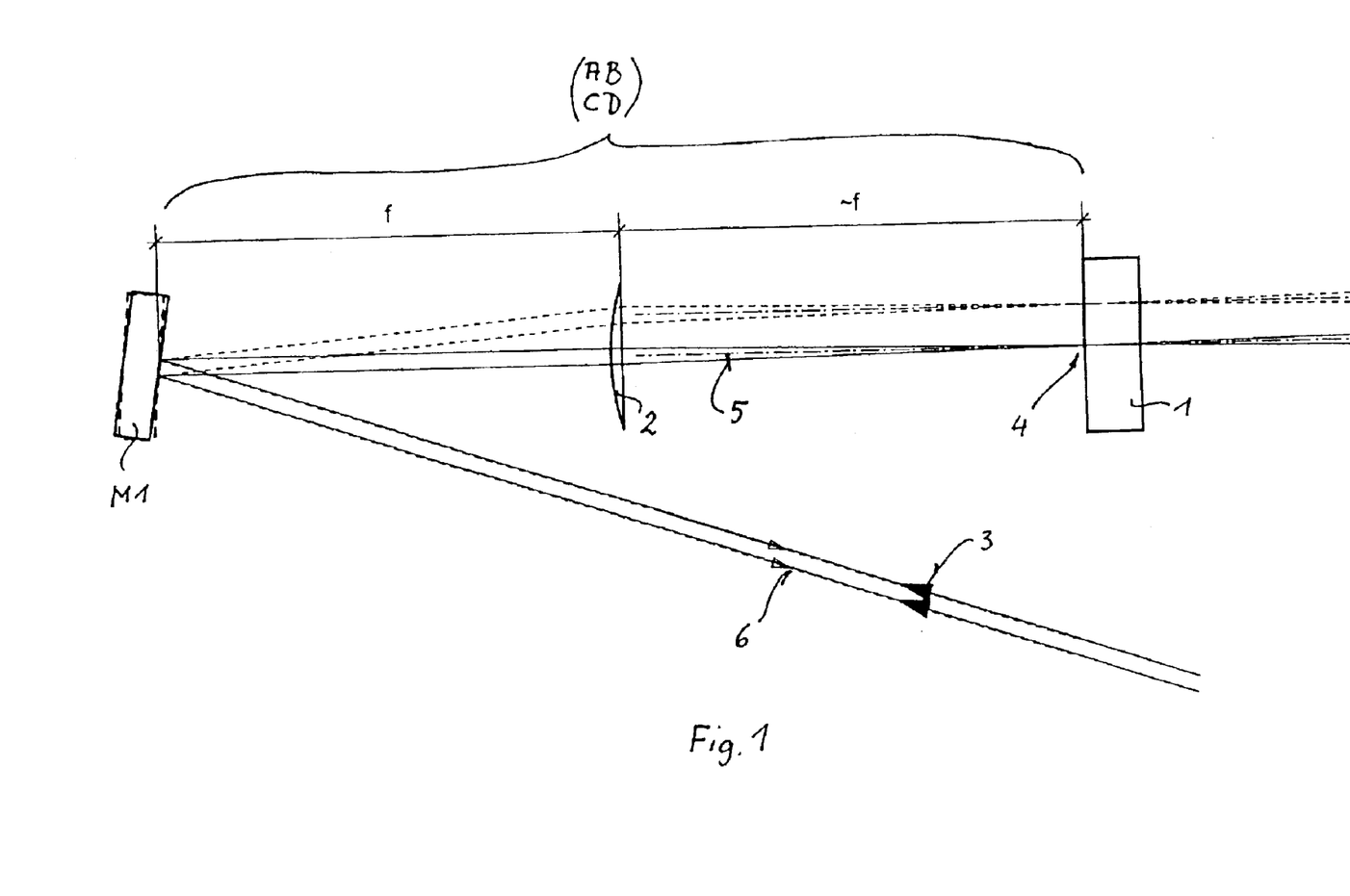
FIG. 1 shows the principle scheme of the invention.

Scheme I: Scheme I of this invention is shown in FIG. 1. Here a reflective optical material 1 is used which is exposed to incident light being imaged or focused through a lens 2. If an incident beam 3 is collimated before reaching the lens 2, the lens 2 will focus the incident beam approximately onto a spot 4 on the optical material 1 (depending on the degree of collimation), the optical material 1 being positioned approximately at a distance corresponding to the focal length f away from the lens 2. If a reflective mirror M1 is put before the lens 2 at a distance corresponding to about the focal length f of the lens, then the spot 4 on the optical (laser) material 1 can be shifted simply by adjusting the angle of the reflecting mirror M1. If M1 is positioned at a distance away from the lens that corresponds exactly to f, the beam propagation axis 5 after the lens 2 (before the optical material 1) does not change its angle at all. Thereby, any change of the angle of the mirror M1 will result in a direct change of the position of the light spot 4 on the optical material 1 without affecting the relative position of the beam propagation axis 5. It becomes evident that the mechanical tolerances for the mirror M1 are uncritical as the relative position of the beam propagation axis 5 remains constant.

The scheme shown in FIG. 1 can for example be used inside a laser resonator, i.e. intra cavity. In a standing wave laser resonator, the scheme of FIG. 1 can be one end of the cavity, in which case the optical material 1 preferably is adjusted such that it reflects the beam back (back reflection beam 6) onto itself, corresponding to the lasing condition. Alternatively, in a linear or ring resonator configuration, the propagation axis does not necessarily have to be perpendicular to the reflecting surface of the optical material. The scheme of FIG. 1 may be used inside a laser resonator in connection with a semiconductor saturable absorber mirror (SESAM) as optical material (see "Semiconductor Saturable Absorber Mirrors (SESAMs) for Femtosecond to Nanosecond Pulse Generation in Solid-State Lasers", U. Keller, K. Weingarten, F. X. Kärtner, D. Kopf, B. Braun, I. Jung, R. Fluck, C. Hönninger, N. Matuschek, J. Aus der Au, IEEE Journal of Selected Topics in Quantum Electronics, Vol. 2, No. 3, pp. 435 ff (1996)). Any degradation effect on one spot after some time can be circumvented by tilting the angle of the mirror M1 and thereby moving to another spot. This adjustment of the mirror M1 does not or does not substantially affect the laser alignment, since the lasing condition is still fulfilled (back reflection onto itself). Therefore, the mirror M1 has the specific property of not affecting the laser alignment, but only the position of the spot on the optical material or the SESAM. Given a sufficiently large SESAM area, this can result in a substantial enhancement of the SESAM and thus of the lifetime of the laser system.

Figure 2A:
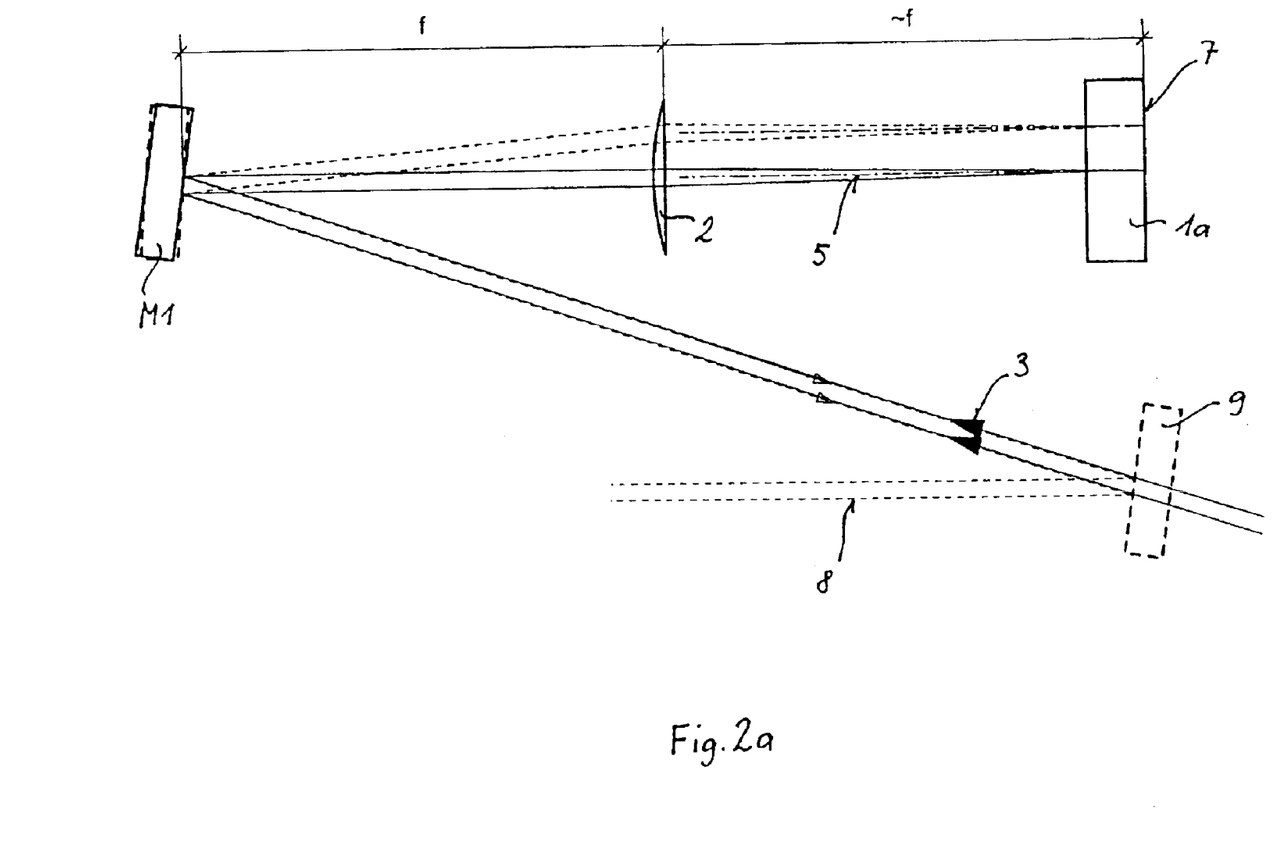
FIG. 2a shows a way for using the scheme of FIG. 1 for frequency conversion.

In FIG. 2a there is shown a way to use the scheme described in FIG. 1 for frequency conversion in combination with a nonlinear crystal 1a, as an example for the optical material, positioned close to the focus f of the lens 2 the incident beam 3 is focused at. In this case the incident beam 3 passes through the nonlinear crystal 1a and is reflected back onto itself, for example by a reflective surface 7 which can be positioned on the back side of the nonlinear crystal 1a (as in the FIG. 2a) or which can be positioned apart (not shown). The orientation of the linear crystal 1a, its cut and length can be determined by standard rules well known in the nonlinear optics literature. Given the parameters of the incident beam 3 and the focal length f of the lens 2, the beam parameters at the crystal can be determined using calculation formulas that are standard and which are useful to determine the parameters of the crystal for obtaining an optimum frequency conversion, as described in the nonlinear optics literature. According to the scheme of FIG. 2a, the frequency-converted beam 8 propagates back after having passed the mirror M1 again along the same axis as the incident beam 3. Then the two beams may be separated from each other by using, for example, a dichroic mirror 9, or a polarizing beam splitter. Likewise, this scheme has the advantage that regardless of the tilt of the mirror M1 and therefore regardless of the position of the spot 4 being used on the optical material 1, 1a, the back-reflected beam 6 (or the frequency-converted beam 8 respectively) remains on the axis and does, on the whole, not change its properties, as for instance its ray profile. If, however, the two beams are chosen not to be on the same axis, there may be used other means to separate them for each other, such as for example a mirror edge.

Figure 2B:
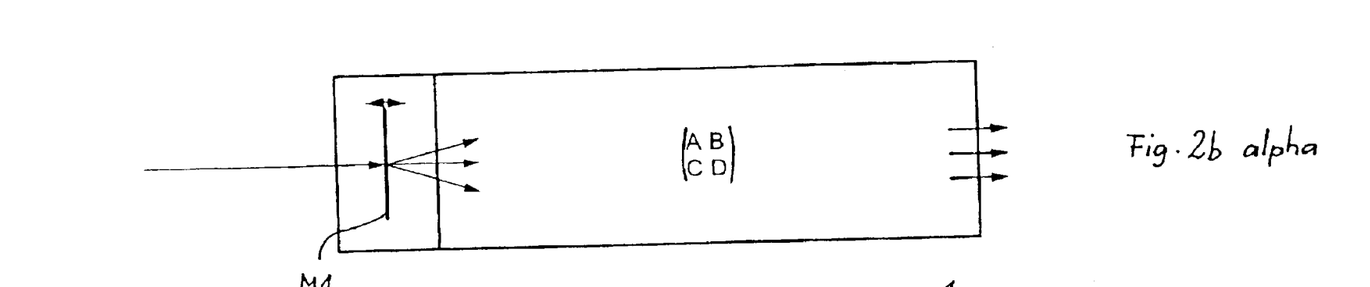
FIGS. 2b α, 2b β and 2b γ show the setup of FIG. 2a in a more generalized form.

A generalized setup is shown in FIG. 2b, where the single lens 2 of FIG. 2a is replaced by a general optical imaging system described by an ABCD-matrix (see Siegman, "Lasers", University Science Books, pages 581 ff). The ABCD-matrix formulism is known both in the ray optics and paraxial optics and is used to calculate the imaging of rays as well as of paraxial beams.

In a first approach, the ABCD matrix is used for imaging rays through the optical system. Generally, the ABCD-matrix formulism allows to image any optical ray (r, r') where r denotes the offset from the optical axis and r' the angle of the beam. After having passed the optical system described by the ABCD-matrix, $$\begin{pmatrix} AB \\ CD \end{pmatrix}$$

(see also FIG. 1) the optical ray changes its offset and angle as calculated by simple matrix calculations:

$$\begin{pmatrix} R \\ R' \end{pmatrix} = \begin{pmatrix} AB \\ CD \end{pmatrix} * \begin{pmatrix} r \\ r' \end{pmatrix} = \begin{pmatrix} Ar + Br' \\ Cr + Dr' \end{pmatrix}$$

This is used for calculating the path of different rays emerging from the same point of the angle-adjustable reflective mirror M1 of FIG. 2a and FIG. 2b. These rays are all on axis and therefore r=0. The different angles are accounted for by corresponding different values for r'. The angle-adjustable mirror M1 is followed by the optical system described by the ABCD-matrix. The resulting outcoming beams should now be all parallel to the optical axis, if R'=0, which leads to the condition that Cr+Dr'=0. This should be true for all r'. Taking into account that r=0, this leads to the condition D=0. In generalized terms, any optical system described by an ABCD-matrix with D=0 will result in analogous beam paths as described in FIG. 2a.

In a second approach, the ABCD matrix is used for calculating the size of the laser spot 4b at the position of a first crystal 1b. According to the rules given in "Lasers", Siegman, the laser beam incident on the angle-adjustable mirror M1 can be described in generalized parameters (p, q) instead of the parameters (r, r'). Given these laser beam parameters, the same ABCD matrix can now be used to determine the size of the laser spot 4b on the crystal 1b. Since D=0 is already fixed, the other parameters A, B, and C can be chosen in order to obtain a predetermined spot size on the crystal 1b.

FIG. 2b alpha, beta and gamma show different possible schemes obtained following the guidelines given above. In FIG. 2b beta an example is shown how two crystals in series can be illuminated by the laser beam which first passes the angle-adjustable mirror, then a first optical system described by $$\begin{pmatrix} A1B1 \\ C1D1 \end{pmatrix}$$

then the first crystal 1b, followed by a second optical imaging system $$\begin{pmatrix} A2B2 \\ C2D2 \end{pmatrix}$$

and then the second crystal 1c. In this case, the conditions for the second optical imaging system $$\begin{pmatrix} A2B2 \\ C2D2 \end{pmatrix}$$

are different because there is the aim to ensure that parallel rays entering the system will again come out as parallel rays. This will be the case when R'=0 and thus C2=0. FIG. 2b gamma shows a simple embodiment using two lenses for the second optical imaging system $$\begin{pmatrix} A2B2 \\ C2D2 \end{pmatrix}$$

This can be accomplished, for example, if the first lens 10a is positioned at a distance L1, corresponding to its focal length, from the first crystal 1b, and the second lens 10b separated from the first lens by a distance corresponding to the sum of the focal length of the first and the second lens L1, L2, and the second crystal 1b positioned in a distance corresponding to the focal length L2 of the second lens 10b. In a practical setup, for example, L1=11 mm, f1=11 mm, L2=11+8=19 mm, f2=8 mm, L3=8 mm. In these setups, the laser beam properties at the second crystal 10b may also be obtained by using the same matrix $$\begin{pmatrix} A2B2 \\ C2D2 \end{pmatrix}$$

for the calculation of those parameters. The setup of FIG. 2b gamma with the above parameters can be used, for example, to generate ultraviolet laser light from pulsed infrared laser light. For this purpose, non-critically phase-matched LBO can be used as the first crystal 10a, and critically phase-matched LBO as the second crystal 10b.

Figure 3:
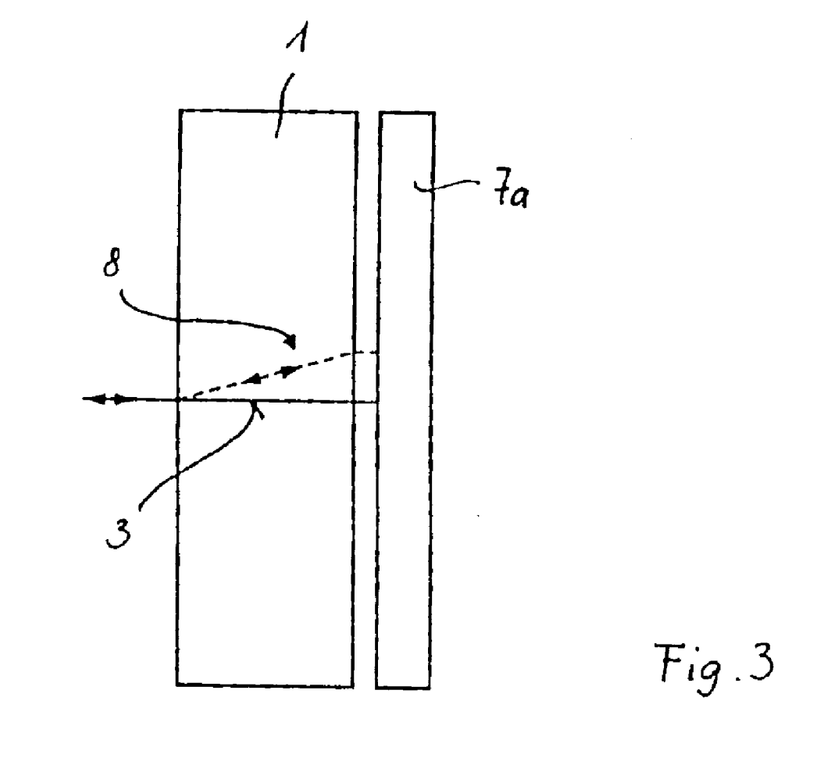
FIG. 3 shows the propagation of the frequency-converted beam and the fundamental beam inside the nonlinear optical material.

In FIG. 2a any walk-off is neglected that might occur inside the optical material between the fundamental (i.e. incident) and the frequency-converted beam, which results in the two beams being on the same axis. However, the same scheme can be used if (even strong) walk-off will result. As shown in FIG. 3, even then, the frequency-converted beam 8 and the fundamental (incident) beam 3 will still be on axis. The frequency-converted beam 8 travels along a different axis inside the nonlinear optical material 1a. All beams, however, will exit the material on parallel axes, as shown in FIG. 3. After being reflected on the reflector 7a, the back-travelling beams 8 and 3 are combined finally in the same axis when exiting the front side of the nonlinear optical material 1a. The same considerations apply when the reflecting surface 7a is directly attached to the back side of the nonlinear optical material 1a, perpendicular to the axis of the incident beam 3. These considerations also apply for any kind of birefringent optical material and are not necessary limited to nonlinear optical materials.

Generally, in all schemes described above and shown in the Figures the lens 3 can also be replaced by a reflective mirror with corresponding focal length. Likewise, the lens or reflective focusing mirror does not have to be spherical, as would be most common in many applications. But it could also be a cylindrical lens or a cylindrical focusing mirror, in which case all considerations above only apply in one transverse direction. Furthermore, the lens does not have to be a plano-concave lens, as depicted in all figures for simplicity, but it could be any kind of focusing means. For example, achromatic lenses, doubletts, cylindrical lenses, parabolic mirrors, and many more would apply. Aberration corrected lenses and parabolic mirrors would even have advantages in the sense that off-axis angle aberrations can be reduced in comparison to other types of lenses. As long as the conditions for the (ABCD)-matrix are fulfilled as described above—alternatively a lens system could be applied.

Any features depicted in the figures may be put together in arbitrary combinations. A person skilled in optics and laser physics might find solutions falling within the scope of this invention.

FIG. 4 shows the technical drawing of one possible setup of a simple and stable optical holder, that needs only two screws. The holder is machined out of a solid aluminum block. Other materials may also be suitable. The machining may be done from three sides. As a non limiting example, the holder shown in FIG. 4 is designed for holding an optical component 12 or a laser mirror with 12.7 mm diameter and 9.5 mm length. It is to be understood that the holder can be made substantially smaller or larger. A first hole H1 holding for example the laser mirror has a diameter somewhat larger than 12.7 mm, for example 13.5 mm, except for the elevated section on which the mirror is going to sit on. A second hole H2, which is perpendicular to the first hole H1 divides this elevated section into four touching surfaces 11. The optical component, when put into the hole H1, will rest on these four defined touching surfaces 11 in a definite way. Theses surfaces may be shaped differently, as for instance as point surfaces or in the form of a V-groove (FIG. 4d). The optical component 12 may be chosen such as to have one or both of its surfaces 14 wedged (dotted line in FIG. 4b). Then the rotation of the optical component 12 around its axis, as indicated in FIG. 4b with the circled arrow to the right, results in a fine change of the vertical angle of the wedged surface 14. This is the way to have to achieve a fine tuning of the vertical angle on the wedged surfaces before a set screw 13a on the top of the optical holder will be fixed. Once the vertical angle and the set screw 13a are fixed, the holder can still be horizontally rotated and adjusted, and will finally be fixed to an optical platform or post (not shown) by a second screw 13b.

Figure 4A:
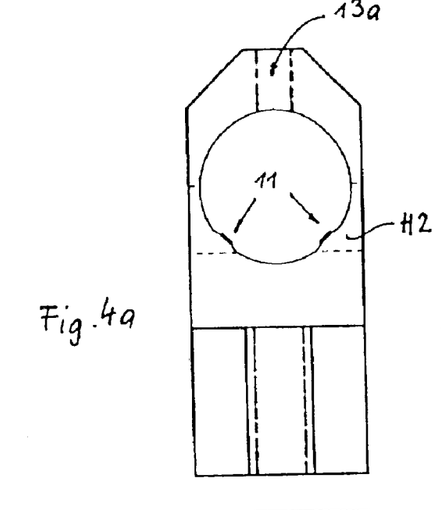
FIG. 4a shows a front view, FIG. 4b a cross-sectional view perpendicular to FIG. 4a and FIG. 4c a top view.
Figure 4B:
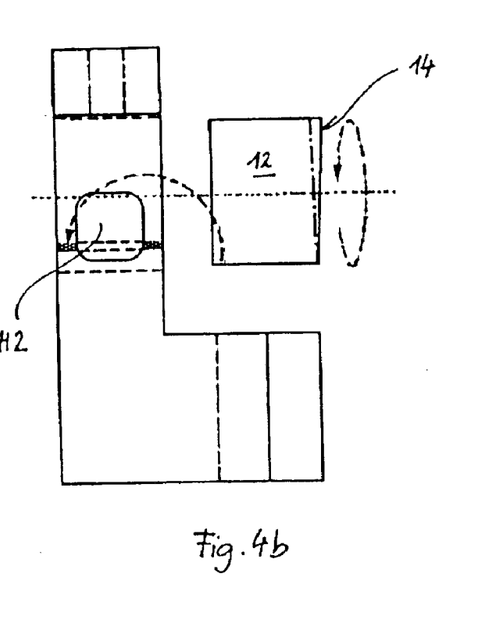
Figure 4C:
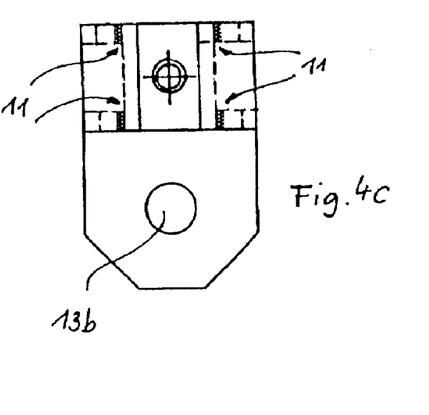
Figure 4D:
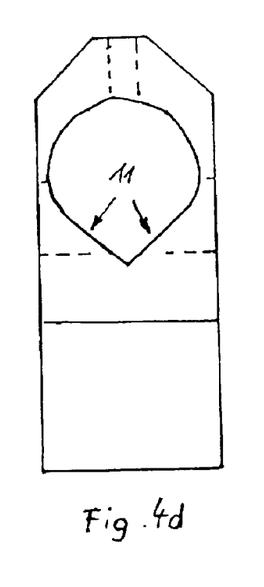

The optical component 12 can, for example, be a laser mirror where the wedged surface is coated with a reflective coating for the wavelength of interest. Also, the optical component could be used in transmission rather than in reflection, in which case the surface angle can again be pre-tuned due to a wedge. Any other optical materials can be used similarly.

Figure 5A:
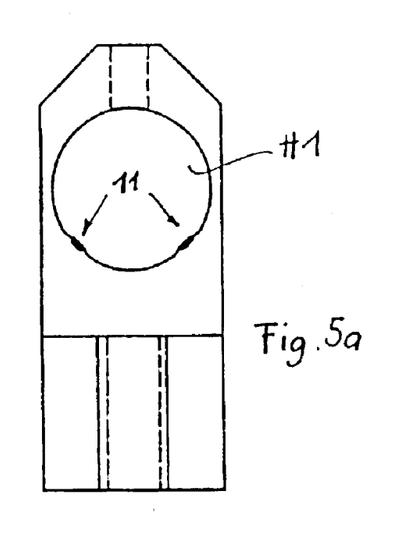
FIGS. 5a, 5b and 5c show, according to FIGS. 4a, 4b and 4c, an alternative embodiment for an optical holder
Figure 5B:
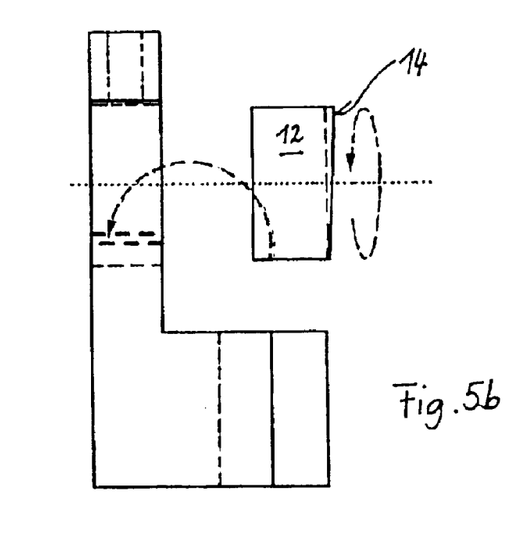
Figure 5C:
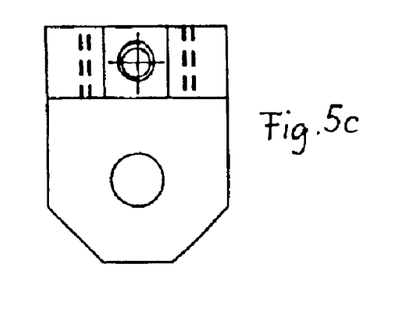

Another setup for an optical holder is shown in FIG. 5. Only the first hole H1 for holding an optical component is provided and the touching surfaces are made as two parallel sections 11b for supporting the optical component 12. Such a type of an optical holder has the advantage of being particularly simple to manufacture. It can be manufactured by machining from two sides only.

Figure 6A:
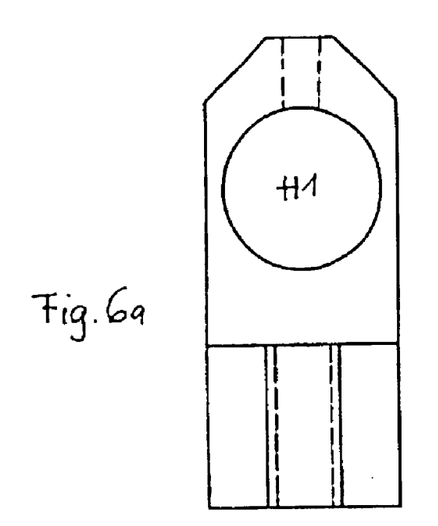
FIGS. 6a, 6b and 6c show, according to FIGS. 4a, 4b and 4c, a third alternative for an optical holder.
Figure 6B:
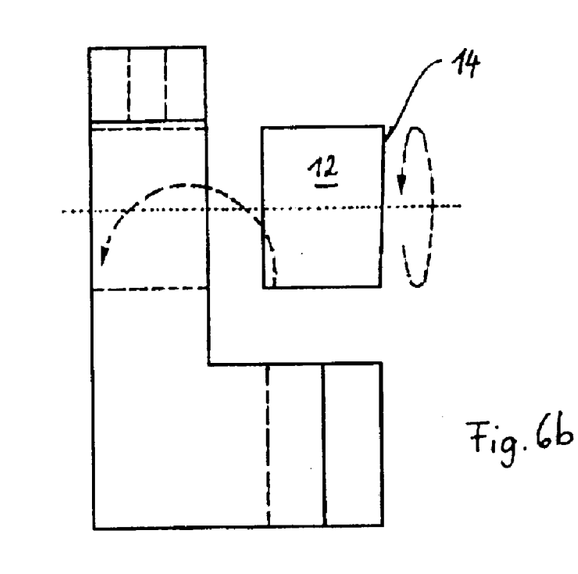
Figure 6C:
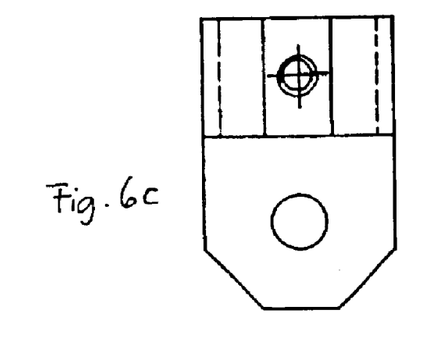

FIG. 6 shows a third alternative for an optical holder where the first hole H1' is made as a simple hole only with no supporting section protruding like in the previous two embodiments. This first hole H1' can then be made such that the optical component 12 will fit in tightly, with the set screw 13a holding the component in place. Alternatively, glue may be used instead or in addition to the set screw 13a. If only glue is used, this results in a mirror holder which will require one single screw only for mounting the optical holder onto the optical platform. Before the glue will be dry, it will still be possible to adjust the angle of the wedged surface vertically by rotating the optical component around its axis.

Generally, all features mentioned above may be combined in arbitrary ways. Also, features of optical holders known in the art may be combined with features of this invention.

EXAMPLES FOR APPLICATION

This invention can be used in laser or optical systems. In particular, if such systems contain an optical material which degrades with time under light exposure, this invention may be a simple solution as to how to increase the overall lifetime of the laser or optical system. As an example, in a typical laser using a SESAM for the generation of picosecond or femtosecond pulses, the beam diameter may be in the order of 100 micro meters. The overall area of the SESAM, however, can be much larger than the size of the laser spot. Given a SESAM size of for example 5 mm×5 mm, this will result in approximately 625 spots that can be used over the SESAM surface. This will result in 625.000 hours of operation provided that each spot will endure about 1.000 hours of operation.

For optical materials that are inhomogeneous, this invention may be used to search for a good spot or avoid bad spots by tilting M1 until the desired spot quality is reached.

Another example is the generation of ultra violet light (UV) according to the setup of FIG. 2a: To accomplish nonlinear optical frequency conversion from the green into the UV, for example BBO can be used as the optical material in the configuration of FIG. 2a. M1 is made reflective for both the incident green light and the back-reflected frequency-doubled ultra-violet light. The lens is made transmissive for both wavelengths. The walk-off apparent in BBO is compensated according to the scheme of FIG. 3. The dichroic mirror can be used to separate the two wavelengths. As an alternative, M1 can be made high transmissive for the UV and reflective for the incident wavelength, in which case M1 would act as the dichroic mirror. However, any tilt of M1 would then result in a change of the UV output direction.

If a cylindrical lens or a cylindrical mirror or any other focusing means is used that only acts in one transverse direction, this would generate an asymmetric beam inside the optical material. This can result in a number of advantages: In an optical material such as a nonlinear optical crystal, the different beam properties in the two transverse directions can each separately be well matched to the requirements for optimum frequency conversion according to standard nonlinear optics formulas. For example, the angle acceptance for frequency conversion in an optical material may be higher in the vertical transverse direction than in the horizontal direction, in which case a stronger focusing condition is preferably used in the vertical direction. Likewise, walk-off may occur predominantly in one transverse direction, in which case the focusing condition can also be matched to the walk-off angle. An asymmetric beam inside a vertically squeezed nonlinear optical crystal can result in a one-dimentional heat flow which can increase the thermal load the crystal can take in comparison to radial cooling.

The optical holder described in this invention may be used in combination with the first objective of the invention. For example, if may be used as holder for the optical material in a setup such as described in FIGS. 1 to 3.

What is claimed is:

1. Laser system for using nonlinear optical effects, comprising at least
    a laser setup for generating a laser beam (3),
    a nonlinear optical material (1a), used for frequency conversion
    an optical system with imaging means for imaging said laser beam (3) onto said nonlinear optical material (1a), which imaging means comprise
        at least an optical imaging system (2) for focusing said laser beam onto the nonlinear optical material (1a) and
        at least an optical means (M1) for changing the angle of the propagation axis of said laser beam (3),
    whereby said optical imaging system is positioned between said optical means (M1) and said nonlinear optical material (1a), and may be described by a $$\begin{pmatrix} A & B \\ C & D \end{pmatrix} - \text{matrix},$$

whereby D is substantially zero.

2. Laser system according to claim 1 characterized in that said optical means (M1) is a part of a resonator of said laser setup.

3. Laser system according to claim 1 characterized in that said laser beam (3) is reflected back onto itself after passing said nonlinear optical material (1a).

4. Laser system according to claim 3 characterized in that said laser beam (3) is reflected back onto itself by a reflective surface (7a) on the back side of said nonlinear optical material (1a).

5. Laser system according to claim 1 comprising a dichroic mirror (9) or a polarizing beam splitter.

6. Laser system according to claim 1, wherein said nonlinear optical material (1, 1b) is
 a semiconductor saturable absorber; or
 a nonlinear optical crystal used for frequency conversion; or
 lithium borate (LBO), beta-barium borate (BBO), potassium titanyl phosphate (KTP), cesium lithium borate (CLBO) or periodically poled lithium niobate (PPLN).

7. Adjustable optical means for an optical system according to claim 1, comprising
 a optical component (12), with one or two wedged surfaces (14) and
 a holder for said optical component (12), positioned onto an optical platform or the like, comprising
  means for supporting said optical component (12) which supporting means comprise four defined touching surfaces (11);
  one recess for inserting said optical component (12);
  one fixing means, for fixing said optical component (12) in the recess;
 wherein said optical component (12) is rotatable around its axis in said recess.

8. Adjustable optical means according to claim 7, wherein the length of said defined touching surfaces (11) is smaller than the distance between said defined touching surfaces (11).

9. Adjustable optical means according to claim 7, wherein the defined touching surfaces (11) are shaped in the form of V-grooves.

10. Adjustable optical means according to claim 7, wherein said optical component (12) and said recess are substantially cylindrical.

11. Optical system for a laser system with an optical material (1, 1b), which has limited durability under light exposure, comprising:
 at least first imaging means for imaging a laser beam (3) onto said first optical material (1, 1b), which imaging means comprise
  at least a first optical imaging system (2) for focusing said laser beam (3) onto said first optical material (1, 1b) and
  at least a first optical means (M1) for changing the angle of the propagation axis of said laser beam (3),
 whereby said first optical imaging system is positioned between said first optical means (M1) and said first optical material (1, 1b), and may be described by a $$\begin{pmatrix} AB \\ CD \end{pmatrix} - \text{matrix,}$$

whereby D is substantially zero.; and
 whereby said first optical means (M1) is a part of a resonator of said laser system.

12. Optical system according to claim 11 comprising:
 second imaging means for imaging said laser beam (3) onto a second optical material (1c) whereby the second imaging means comprise:
  at least a second optical imaging system (2) for focusing said laser beam (3) onto the second optical material (1c) and
  at least a second optical means for changing the relative position of the propagation axis of the laser beam (3), whereby said second optical imaging system is positioned between said second optical means and said second optical material (1c), and may be described by a $$\begin{pmatrix} AB \\ CD \end{pmatrix} - \text{matrix,}$$

whereby C is substantially zero.

13. Optical system according to claim 11, wherein said first optical material (1,1b) and/or said second optical material (1c) is
 a semiconductor saturable absorber; or
 a nonlinear optical crystal used for frequency conversion; or
 lithium borate (LOB), beta-barium borate (BBO), potassium titanyl phosphate (KTP), cesium lithium borate (CLBO) or periodically poled lithium niobate (PPLN).

* * * * *